(12) United States Patent
Vartanian et al.

(10) Patent No.: US 10,599,923 B2
(45) Date of Patent: Mar. 24, 2020

(54) MOBILE DEVICE UTILIZING MULTIPLE CAMERAS

(71) Applicant: HJ LABORATORIES, LLC, Bryn Mawr, PA (US)

(72) Inventors: Harry Vartanian, Bryn Mawr, PA (US); Jaron Jurikson-Rhodes, Philadelphia, PA (US)

(73) Assignee: HJ LABORATORIES, LLC, Bryn Mawr, PA (US)

(*) Notice: Subject to any disclaimer, the term of this patent is extended or adjusted under 35 U.S.C. 154(b) by 0 days.

(21) Appl. No.: 15/966,622

(22) Filed: Apr. 30, 2018

(65) Prior Publication Data

US 2019/0005320 A1  Jan. 3, 2019

Related U.S. Application Data

(63) Continuation of application No. 15/433,707, filed on Feb. 15, 2017, now Pat. No. 9,959,464, which is a
(Continued)

(51) Int. Cl.
| | |
|---|---|
| *G06K 9/00* | (2006.01) |
| *G06F 3/01* | (2006.01) |
| *H04N 1/00* | (2006.01) |
| *H04N 5/232* | (2006.01) |
| *H04N 1/195* | (2006.01) |
| *G06F 16/955* | (2019.01) |
| *H04N 13/25* | (2018.01) |
| *H04N 13/00* | (2018.01) |

(52) U.S. Cl.
CPC ......... *G06K 9/00442* (2013.01); *G06F 3/017* (2013.01); *G06F 16/955* (2019.01); *H04N 1/00827* (2013.01); *H04N 1/19594* (2013.01); *H04N 5/23293* (2013.01); *H04N 13/25* (2018.05); *G06T 2207/30176* (2013.01); *H04N 2013/0081* (2013.01); *H04N 2201/0084* (2013.01)

(58) Field of Classification Search
None
See application file for complete search history.

(56) References Cited

U.S. PATENT DOCUMENTS

| | | |
|---|---|---|
| 6,127,928 A | 10/2000 | Issacman et al. |
| 6,144,997 A | 11/2000 | Lamming et al. |

(Continued)

FOREIGN PATENT DOCUMENTS

| | | |
|---|---|---|
| WO | 2007012899 A1 | 2/2007 |
| WO | 2012011044 A1 | 1/2012 |

OTHER PUBLICATIONS

Condliffe, B., "Is This the Best Gesture Control System Ever?," May 21, 2012, pp. 1-2.

(Continued)

*Primary Examiner* — Mark T Monk
(74) *Attorney, Agent, or Firm* — Volpe and Koenig, P.C.

(57) ABSTRACT

A mobile electronic device may have two rear facing cameras to capture environmental information. A camera and a depth sensor of the mobile electronic device may capture biometric facial data for security verification. Characteristics of the environment may be identified based on the environmental information and results of the security verification.

8 Claims, 6 Drawing Sheets

Related U.S. Application Data continuation of application No. 14/971,483, filed on Dec. 16, 2015, now Pat. No. 9,578,200, which is a continuation of application No. 13/480,107, filed on May 24, 2012, now Pat. No. 9,218,526.

(56) References Cited

U.S. PATENT DOCUMENTS

| | | |
|---|---|---|
| 6,184,847 B1 | 2/2001 | Fateh et al. |
| 6,869,023 B2 | 3/2005 | Hawes |
| 6,964,374 B1 | 11/2005 | Djuknic et al. |
| 7,027,311 B2 | 4/2006 | Vanderelli et al. |
| 7,050,835 B2 | 5/2006 | Hack et al. |
| 7,222,852 B2 | 5/2007 | Soltys et al. |
| 7,225,414 B1 | 5/2007 | Sharma et al. |
| 7,443,548 B2 | 10/2008 | Sprague et al. |
| 7,543,758 B2 | 6/2009 | Dyrnetman et al. |
| 7,586,655 B1 | 9/2009 | Uhlik et al. |
| 7,605,844 B1 | 10/2009 | Page et al. |
| 7,633,493 B2 | 12/2009 | Syeda-Mahmood et al. |
| 7,643,312 B2 | 1/2010 | Vanderelli et al. |
| 8,036,497 B2 | 10/2011 | Kise et al. |
| 8,166,421 B2 | 4/2012 | Magal et al. |
| 8,325,139 B2 | 12/2012 | Nash et al. |
| 8,395,655 B2 | 3/2013 | Robinson et al. |
| 8,451,249 B2 | 5/2013 | Burns et al. |
| 8,456,503 B2 | 6/2013 | Hoelsaeter |
| 8,462,207 B2 | 6/2013 | Garcia et al. |
| 8,466,873 B2 | 6/2013 | Vertegaal et al. |
| 8,466,902 B2 | 6/2013 | Boer et al. |
| 8,488,246 B2 | 7/2013 | Border et al. |
| 8,492,696 B2 | 7/2013 | Akerman et al. |
| 8,528,036 B2 | 9/2013 | Davis et al. |
| 8,547,341 B2 | 10/2013 | Takashima et al. |
| 8,571,298 B2 | 10/2013 | McQueen et al. |
| 8,600,989 B2 | 12/2013 | Hull et al. |
| 8,605,039 B2 | 12/2013 | Danielsson et al. |
| 8,610,674 B2 | 12/2013 | Pryor |
| 9,218,526 B2 | 12/2015 | Vartanian et al. |
| 9,578,200 B2 | 2/2017 | Vartanian et al. |
| 2004/0119605 A1 | 6/2004 | Schaper |
| 2004/0119662 A1* | 6/2004 | Dempski ............... G01S 3/7864 345/8 |
| 2004/0267734 A1 | 12/2004 | Toshima |
| 2006/0012677 A1 | 1/2006 | Neven, Sr. et al. |
| 2006/0066723 A1 | 3/2006 | Iwase et al. |
| 2006/0083409 A1 | 4/2006 | Yuzawa et al. |
| 2006/0096392 A1 | 5/2006 | Inkster et al. |
| 2006/0184513 A1 | 8/2006 | Ohtsuka et al. |
| 2006/0227992 A1 | 10/2006 | Rathus et al. |
| 2007/0046982 A1 | 3/2007 | Hull et al. |
| 2007/0085838 A1 | 4/2007 | Ricks et al. |
| 2007/0096907 A1 | 5/2007 | Jam et al. |
| 2007/0139391 A1 | 6/2007 | Bischoff |
| 2007/0247422 A1 | 10/2007 | Vertegaal et al. |
| 2010/0030778 A1 | 2/2010 | Liu et al. |
| 2010/0067691 A1 | 3/2010 | Lin et al. |
| 2010/0169138 A1 | 7/2010 | Sagi et al. |
| 2010/0177169 A1 | 7/2010 | Saric |
| 2010/0199232 A1* | 8/2010 | Mistry ............... G06F 1/163 715/863 |
| 2010/0238114 A1 | 9/2010 | Vartanian et al. |
| 2011/0025827 A1 | 2/2011 | Shpunt et al. |
| 2011/0096174 A1 | 4/2011 | King et al. |
| 2011/0096182 A1 | 4/2011 | Cohen et al. |
| 2011/0110594 A1 | 5/2011 | Hasegawa et al. |
| 2011/0115930 A1 | 5/2011 | Kulinets et al. |
| 2011/0145431 A1 | 6/2011 | Momchilov et al. |
| 2011/0170742 A1 | 7/2011 | Fukuchi et al. |
| 2011/0188054 A1 | 8/2011 | Petronius et al. |
| 2011/0199342 A1 | 8/2011 | Vartanian et al. |
| 2011/0211044 A1 | 9/2011 | Shpunt et al. |
| 2011/0218018 A1 | 9/2011 | Phillips et al. |
| 2011/0320924 A1 | 12/2011 | Ratan et al. |
| 2012/0050488 A1 | 3/2012 | Cohen et al. |
| 2012/0062736 A1 | 3/2012 | Xiong |
| 2012/0075491 A1 | 3/2012 | Hoarau et al. |
| 2012/0084670 A1 | 4/2012 | Momchilov |
| 2012/0102552 A1 | 4/2012 | Sammon et al. |
| 2012/0105613 A1 | 5/2012 | Weng et al. |
| 2012/0105679 A1 | 5/2012 | Osuga et al. |
| 2012/0166203 A1 | 6/2012 | Fuchs et al. |
| 2012/0264485 A1 | 10/2012 | Wright et al. |
| 2013/0107021 A1 | 5/2013 | Maizels et al. |

OTHER PUBLICATIONS

Mohan, A. et al., "Bokode: Imperceptible Visual tags for Camera Based Interaction from a Distance," pp. 1-8.

Oswaks, M., "3D Projector Would Beam Long-Distance Pals Right Into Your Own Living Room," May 2, 2012, http://gizmodo.com/5907189/3d-projector-would-beam-long-¢distance-lovers-right-into-your-own-living-room, pp. 1-2.

Rekimoto, J., "Matric :A Realtime Object Identification and Registration Method for Augmented Reality," in Proceedings of Asia Pacific Computer Human Interaction 1998 (APCHI'98), 1998, pp. 1-6.

Gupta, s_ et al., "SoundWave: Using the Doppler Effect to Sense Gestures," in Proceedings of ACM CHI 2012, May 2012, May 5-10, 2012, pp. 1-4.

Non-final Office Action from U.S. Appl. No. 13/460,107 dated Jul. 26, 2013.

Non-final Office Action from U.S. Appl. No. 13/480,107 dated Aug. 14, 2014.

Final Office Action from U.S. Appl. No. 13/480,107 dated May 7, 2015.

Notice of Allowance from U.S. Appl. No. 13/480,107 dated Feb. 10, 2014.

Notice of Allowance from U.S. Appl. No. 13/460,107 dated Aug. 19, 2015.

Non-final Office Action from U.S. Appl. No. 14/971,483 dated Apr. 7, 2016.

Notice of Allowance from U.S. Appl. No. 14/971,483 dated Oct. 11, 2016.

* cited by examiner

MOBILE DEVICE UTILIZING MULTIPLE CAMERAS

CROSS REFERENCE TO RELATED APPLICATION(S)

This application is a continuation of U.S. patent application Ser. No. 15/433,707, filed Feb. 15, 2017, which is a continuation of U.S. patent application Ser. No. 14/971,483, filed Dec. 16, 2015, which issued as U.S. Pat. No. 9,578,200 on Feb. 21, 2017, which is a continuation of U.S. patent application Ser. No. 13/480,107, filed May 24, 2012, which issued as U.S. Pat. No. 9,218,526 on Dec. 22, 2015, which is incorporated by reference as if fully set forth.

TECHNICAL FIELD

This application is related to an apparatus and method to detect a paper document, book, or other objects using one or more sensors.

BACKGROUND

Electronic devices such as tablets, mobile devices, cellular phones, personal digital assistants, smartphones, tablet personal computers (PCs), laptop computers, notebook computers, televisions, digital picture frames, large displays, or the like, have helped to reduce the volume of printing and increase paperless environments. Nevertheless, printed content still plays a significant portion of life and business. Even with the many benefits of digital content, printed content is still desirable.

More and more electronic devices, especially mobile computers, are being built with cameras and other sensors to capture and gather information. However, using such instruments for accurate, quick, and seamless detection of papers, documents, and other objects still is lacking.

Current work environments look to digitize information to do work on a computer and manage documents. This brings the real-world into the digital world where information and documents mostly flow one direction into the digital world. However, bringing the digital world to a real-world work environment is also desired since many documents are printed and people enjoy reading books. In this working model, information mostly flows from the digital world to the real-world.

Therefore, it is desirable to detect paper documents, books, and other objects using one or more image sensors to provide an enhanced paper-digital environment.

SUMMARY

An apparatus and method for detecting paper documents, books, or other objects using one or more sensors, such as cameras, on one or more computing devices is disclosed. The one or more computing devices communicate and share information such that a paper document, book, or other object in a given space is detected and identified. Once indentified, information relevant to the paper documents, books, or other objects is retrieved.

BRIEF DESCRIPTION OF THE DRAWINGS

A more detailed understanding may be had from the following description, given by way of example in conjunction with the accompanying drawings wherein.

DETAILED DESCRIPTION

Figure 1:
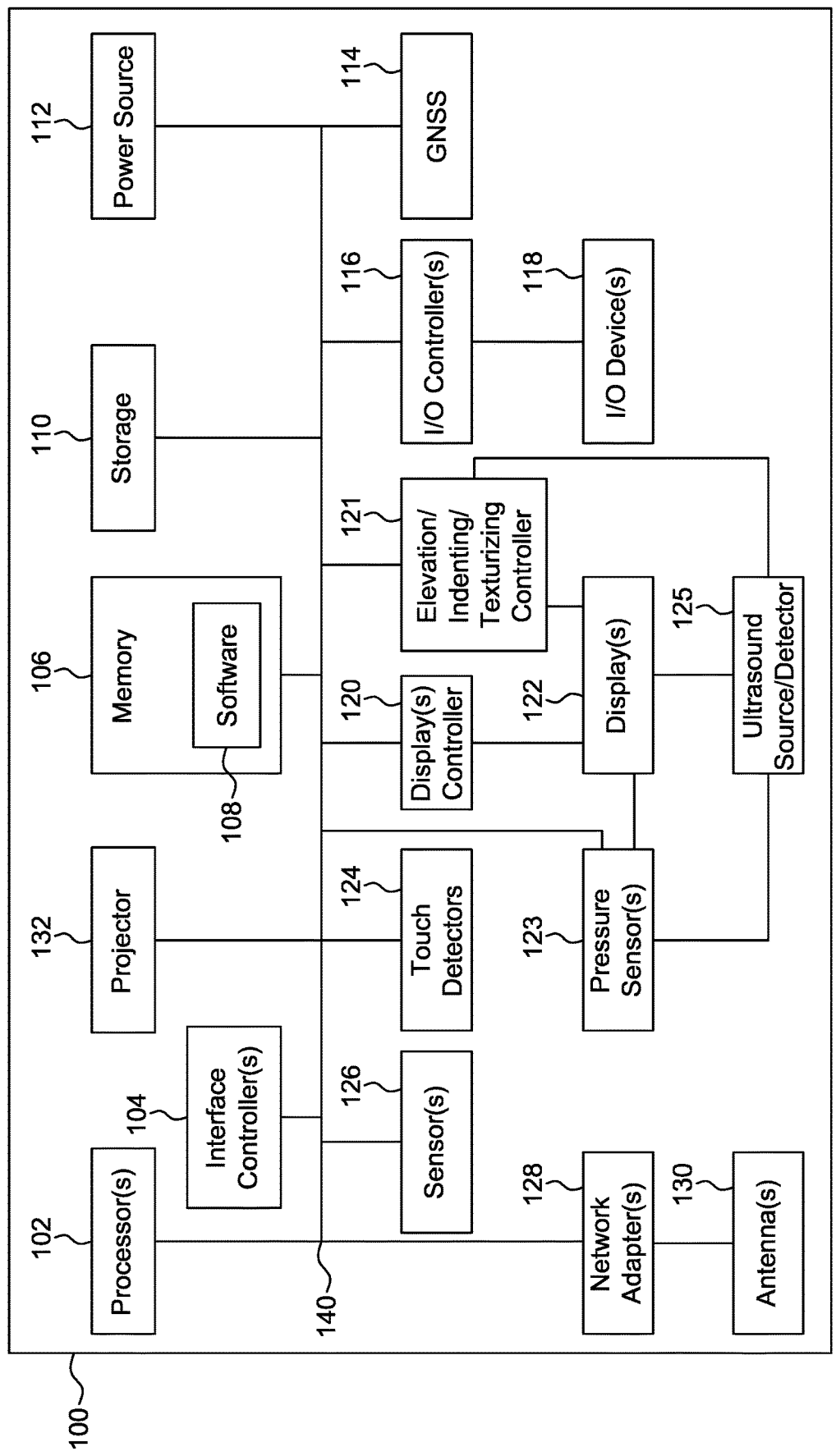
FIG. 1 is a diagram of an electronic device.

Examples will be described with reference to the drawing figures wherein like numerals represent like elements throughout. For the methods and processes described below the steps recited may be performed out of sequence in any order and sub-steps not explicitly described or shown may be performed. In addition, "coupled" or "operatively coupled" may mean that objects are linked between zero or more intermediate objects. Also, any combination of the disclosed features/elements may be used in one or more embodiments. When using referring to "A or B", it may include A, B, or A and B, which may be extended similarly to longer lists.

U.S. Patent Publication No. 2011-0199342 is herein incorporated by reference as if fully set forth and may be used in combination with the given examples to provide a display device that may adaptively emit ultrasound, ultrasonic, acoustic, or radio waves to provide an elevated, indented, or texturized sensation to an object, person, or paper document near a display device.

FIG. 1 is a diagram of an object device 100 that may be a wireless subscriber unit, mobile device, user equipment (UE), mobile station, smartphone, pager, mobile computer, cellular phone, cellular telephone, telephone, personal digital assistant (PDA), computing device, surface computer, tablet, tablet computer, monitor, general display, versatile device, digital picture frame, appliance, automobile computer system, television device, home appliance, home computer system, laptop, netbook, personal computer (PC), an Internet pad, digital music player, peripheral, add-on, an attachment, virtual reality glasses, media player, video game device, head-mounted display (HMD), helmet mounted display (HMD), glasses, goggles, a wearable computer, wearable headset computer, or any electronic device for mobile or fixed applications.

Object device 100 comprises computer bus 140 that couples one or more processors 102, one or more interface controllers 104, memory 106 having software 108, storage device 110, power source 112, and/or one or more displays controller 120. In addition, object device 100 comprises an elevation, indenting, or texturizing controller 121 to provide sensations to an object or person located near one or more display devices 122.

One or more display devices 122 can be configured as a plasma, liquid crystal display (LCD), light emitting diode (LED), field emission display (FED), surface-conduction electron-emitter display (SED), organic light emitting diode (OLED), flexible OLED, or any other display device. The one or more display devices 122 may be configured, manufactured, produced, or assembled based on the descriptions provided in U.S. Patent Publication Nos. 2007-247422, 2007-139391, 2007-085838, or 2006-096392 or U.S. Pat. No. 7,050,835 or WO Publication No. 2007-012899 all herein incorporated by reference as if fully set forth. In the case of a flexible or bendable display device, the one or more electronic display devices 122 may be configured and assembled using organic light emitting diodes (OLED), liquid crystal displays using flexible substrate technology, flexible transistors, field emission displays (FED) using flexible substrate technology, or the like.

One or more display devices 122 can be configured as a touch or multi-touch screen display using resistive, capacitive, surface-acoustic wave (SAW) capacitive, infrared, strain gauge, optical imaging, dispersive signal technology, acoustic pulse recognition, frustrated total internal reflection, or magneto-strictive technology, as understood by one of ordinary skill in the art. One or more display devices 122 can also be configured as a three dimensional (3D), electronic paper (e-paper), or electronic ink (e-ink) display device.

Coupled to one or more display devices 122 may be pressure sensors 123. Coupled to computer bus 140 are one or more input/output (I/O) controller 116, I/O devices 118, global navigation satellite system (GNSS) device 114, one or more network adapters 128, and/or one or more antennas 130. Examples of I/O devices include a speaker, microphone, keyboard, keypad, touchpad, display, touchscreen, wireless gesture device, a digital camera, a digital video recorder, a vibration device, universal serial bus (USB) connection, a USB device, or the like. An example of GNSS is the Global Positioning System (GPS).

Object device 100 may have one or more motion, proximity, light, optical, chemical, environmental, barometric, atmospheric pressure, moisture, acoustic, heat, temperature, radio frequency identification (RFID), biometric, face recognition, image, photo, or voice recognition sensors 126 and touch detectors 124 for detecting any touch inputs, multi-touch inputs, or multiple touch inputs for one or more display devices 122. Sensors 126 may also be an accelerometer, an electronic compass (e-compass), gyroscope, a 3D gyroscope, 3D accelerometer, or the like. One or more interface controllers 104 may communicate with touch detectors 124 and I/O controller 116 for determining user inputs to object device 100. Coupled to one or more display devices 122 may be pressure sensors 123 for detecting presses on one or more display devices 122.

Ultrasound source/detector 125 may be configured in combination with touch detectors 124, elevation, indenting, or texturizing controller 121, one or more display devices 122, pressure sensors 123, or sensors 126 to project or generate ultrasound waves, rays, or beams to an object to simulate elevated, indented, or texturized sensations, recognize inputs, or track the object. There may be cases for input recognition or object tracking wherein an ultrasound is provided without detected sensation to the object.

Still referring to object device 100, storage device 110 may be any disk based or solid state memory device for storing data. Power source 112 may be a plug-in, battery, solar panels for receiving and storing solar energy, or a device for receiving and storing wireless power as described in U.S. Pat. No. 7,027,311 herein incorporated by reference as if fully set forth.

One or more network adapters 128 may be configured as a Frequency Division Multiple Access (FDMA), single carrier FDMA (SC-FDMA), Time Division Multiple Access (TDMA), Code Division Multiple Access (CDMA), Orthogonal Frequency-Division Multiplexing (OFDM), Orthogonal Frequency-Division Multiple Access (OFDMA), Global System for Mobile (GSM) communications, Interim Standard 95 (IS-95), IS-856, Enhanced Data rates for GSM Evolution (EDGE), General Packet Radio Service (GPRS), Universal Mobile Telecommunications System (UMTS), cdma2000, wideband CDMA (W-CDMA), High-Speed Downlink Packet Access (HS-DPA), High-Speed Uplink Packet Access (HSUPA), High-Speed Packet Access (HSPA), Evolved HSPA (HSPA+), Long Term Evolution (LTE), LTE Advanced (LTE-A), 802.11x, Wi-Fi, Zigbee, Ultra-WideBand (UWB), 802.16x, 802.15, Wi-Max, mobile Wi-Max, Bluetooth, radio frequency identification (RFID), Infrared Data Association (IrDA), near-field communications (NFC), or any other wireless or wired transceiver for communication via one or more antennas 130. One or more network adapters 128 may also be configured for automobile to automobile, car to car, vehicle to vehicle (V2V), or wireless access for vehicular environments (WAVE) communication. One or more network adapters 128 may also be configured for human body communications where the human body is used to communicate data between at least two computers coupled to the human body. In addition, any of the communication links referenced herewith may be wired or wireless or both wired and wireless.

Any of devices, controllers, displays, components, etc. in object device 100 may be combined, made integral, or separated as desired. For instance, elevation, indenting, or texturizing controller 121 may be combined with ultrasound source/detector 125 in one unit. Moreover, the descriptions below reference the detection and identification of objects, books, or paper documents. However, the apparatuses and methods described herein may also apply to providing information, detecting, recognizing, or identifying magazines, periodicals, journals, white papers, brochures, folders, or like.

Figure 2:
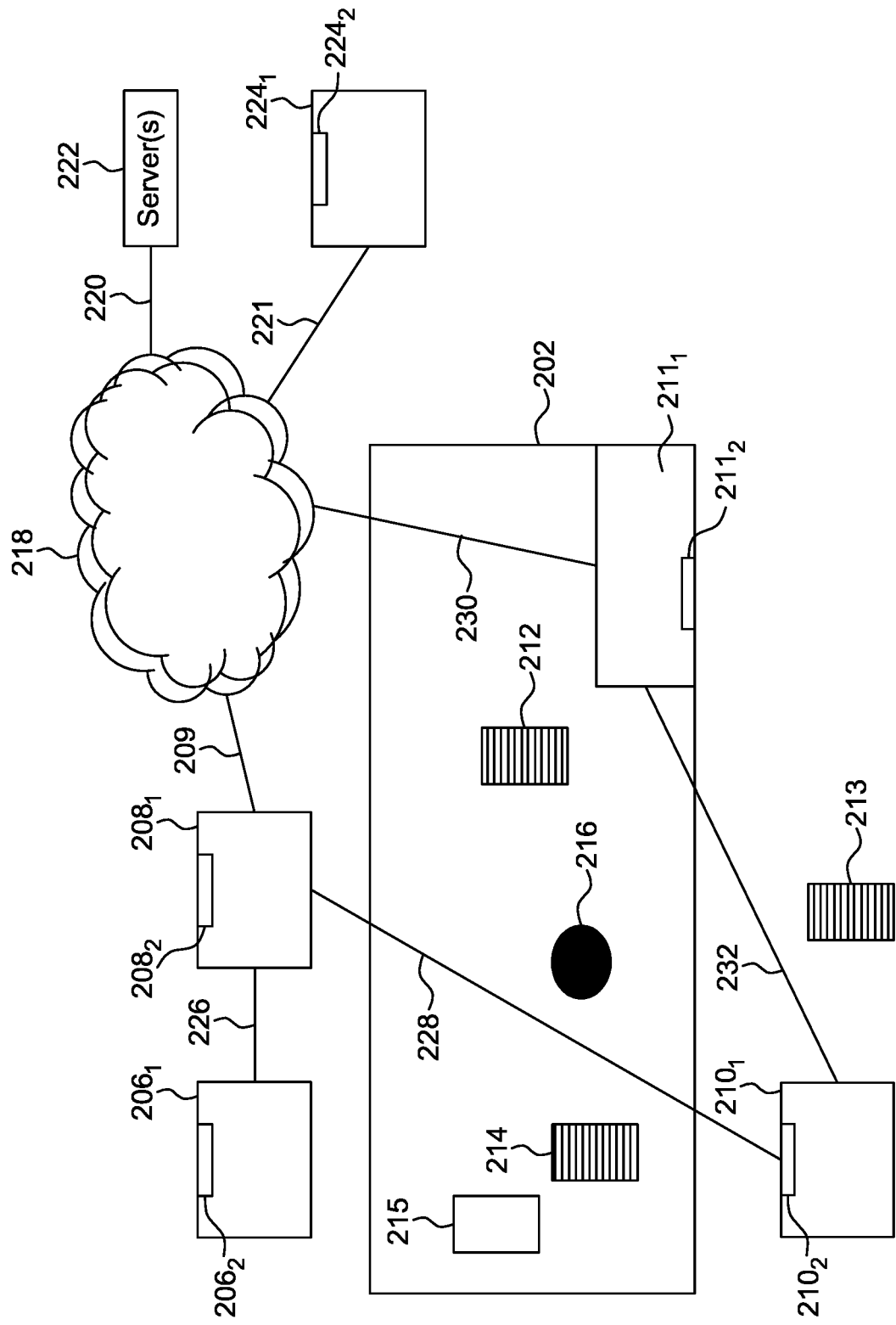
FIG. 2 is a diagram showing devices for detecting at least one object, book, or paper document using one or more sensors.

FIG. 2 is a diagram showing devices for detecting at least one object 216, book 215, or at least one of paper documents 212-214 in workspace 202 using one or more sensors. Although many of the examples forthcoming will be for detecting book 215 or at least one of paper documents 212-214, the same descriptions may apply to at least one object 216. Devices $206_1$, $208_1$, $210_1$, or $224_1$ may be configured as mobile or fixed mobile computing devices with at least some of the components and parts provided in object device 100. Devices $206_1$, $208_1$, $210_1$, or $224_1$ each may be provided with one or more sensors $206_2$, $208_2$, $210_2$, or $224_2$ respectively, that may each be configured as a camera, a field camera, a camera with a 180 degree fisheye lens, an infrared camera, an infrared sensor, an infrared transceiver, a Microsoft Kinect motion sensing device, a Microsoft Kinect motion sensing system, a depth sensor, a laser finder, a stereo vision sensor, or a special paper sensor. Sensor devices for detecting and tracking objects are given by U.S. Patent Publication Nos. 2010-0201811, 2011-0025827, 2011-0096182, 2011-0188054, 2011-0188054, and 2012-0050488 all herein incorporated by reference as if fully set forth. In the examples given herewith, sensors $206_2$, $208_2$, $210_2$, or $224_2$ may be used in combination with any of sensors 126 for detecting at least one object 216, book 215, or at least one of paper documents 212-214 in workspace 202. Although not shown, one or more sensors $206_2$, $208_2$, $210_2$, or $224_2$ may be on other sides, such as the back of devices $206_1$, $208_1$, $210_1$, or $224_1$. For instance, many smartphones, tablets, netbooks, and laptops have front and rear camera sensors.

Workspace 202 may be a certain room, space, virtual room, collaborative environment, meeting room, or the like. Workspace 202 may be configured with special markers, dots, or other indicators to help or assist the detection of at least one of paper documents 212-214 or book 215 by one or more sensors $206_2$, $208_2$, $210_2$, or $224_2$. The markers, dots, or other indicators may be visible or invisible to the human eye but still detectable by one or more sensors $206_2$, $208_2$, $210_2$, or $224_2$.

One or more sensors $206_2$, $208_2$, $210_2$, or $224_2$ may individually, collectively, partially, or in part detect a segment, portion, or piece of content or information on at least one of paper documents 212-214 or book 215 for identification recognition, or providing information. Detection may be performed on the front, back, or both the front and back portions of at least one of paper documents 212-214 or book 215. Using both front and back portions, detection may allow double-sided detection to identify at least one of paper documents 212-214 or book 215. Any detected content or information may be shared via communication links 226 or 228 using one or more network adapters 128. Communication links 226 or 228 may operate using Wi-Fi direct, Digital Living Network Alliance (DLNA), peer-to-peer communication, adhoc networking, or any other device to device communication protocol.

In addition, one or more sensors $206_2$, $208_2$, $210_2$, or $224_2$ may be coordinated to collectively detect edges, text, characters, images, photos, or any other information on at least one of paper documents 212-214 or book 215 for identification. Optical character recognition may be used by any one of devices $206_1$, $208_1$, $210_1$, or $224_1$ or one or more servers 222 in connection with the detected data. Moreover, the characteristics, type, or category of paper documents 212-214 or book 215 may be determined based on the detected dimensions or color of the paper. For instance, some work environments use legal sized paper for contracts or green paper for billing.

If a camera device is configured in one or more sensors $206_2$, $208_2$, $210_2$, or $224_2$, a digital autofocus, digital autozoom, digital autopan, or adaptive aperture control operation may be performed by any one of devices $206_1$, $208_1$, $210_1$, or $224_1$ to adaptively capture different portions or segments of at least one of paper documents 212-214 or book 215. This may allow user-friendly capture from various flexible positions by any one of devices $206_1$, $208_1$, $210_1$, or $224_1$. Moreover, one or more sensors $206_2$, $208_2$, $210_2$, or $224_2$ may be configured to allow adaptive mechanical movement or digital eye detection or tracking of at least one of paper documents 212-214 or book 215.

Any detected content or information may be shared via communication links 209, 226, 228, or 221 using one or more network adapters 128 over network 218 for identification, recognition, or providing information. With using multiple devices and multiple cameras, multicameras or sensors, different view points and angles of at least one of paper documents 212-214 or book 215 may be captured. This may create a document environment or operation that is ubiquitous, seamless, easy, or invisible to a user. It may also allow the user to normally use devices $206_1$, $208_1$, $210_1$, or $224_1$ and at least one of paper documents 212-214 or book 215 since the devices or at least one of paper documents 212-214 or book 215 can be orientated differently for capture or identification purposes.

The sharing or management of captured information by devices $206_1$, $208_1$, $210_1$, or $224_1$ may be performed by client based software or by software on one or more servers 222 where the information is communicated over communication link 220. Client based software may be part of the operating system found in memory 106. Client based software may also be collaborative or work management software such as WebEx or GoToMeeting. The client or network based software may be part of a document management system, workflow system, records management system, enterprise content management (ECM) system, digital asset management system, or a web-based service. The client based software may also be a thin client.

Detected content or information on the front, back, or both the front and back portions of at least one of paper documents 212-214 or book 215 may be one or more quick response (QR) codes, one or more watermarks, invisible markings, an international standard book number (ISBN), an invisible code, information printed using a special ink, an invisible bar code, a unique tracking number, a document management number, a unique marking, or one or more printed labels. Any of the identifying information may also be on the top, bottom, or both top and bottom portions of at least one of paper documents 212-214 or book 215. An example of a printing or smart printing apparatus providing special markings that may uniquely identify each sheet of printed content, such as by pointers, is given in U.S. Pat. No. 6,964,374 herein incorporated by reference as if fully set forth.

With at least one unique code or identifier for a specific physical copy or print-out, different hard copies or versions of at least one of paper documents 212-214 may be tracked for security, copyright management, digital rights management, rights management, or document management purposes. The unique code or identifier may also be detected by a smart shredder (not shown) and shared with any one of devices $206_1$, $208_1$, $210_1$, or $224_1$ or servers 222 to record when at least one paper documents 212-214 was destroyed.

Identification may be performed partially, collaboratively, or completely by any one of devices $206_1$, $208_1$, $210_1$, or $224_1$ by assembling, collecting, processing, or rendering the detected data captured by each device. For paper document 214, device $208_1$ using one or more sensors $208_2$ may detect certain portions of text, image, or other data on paper document 214 from a first angle. For paper document 214, device $210_1$ using one or more sensors $210_2$ may detect other certain portions of text, image, or other data on paper document 214 from a second angle. Devices $208_1$ and $210_1$ may then share, via communication link 228 or any other network, the detected portions captured from the different angles and query a database in the devices or on one or servers 222 to identify paper document 214. This operation may similarly be scaled to devices $206_1$ and $224_1$ to quickly and efficiently identify paper document 214. It may similarly be used to identify paper documents 212 and 213, book 215, or object 216.

Identification may also be performed partially or completely by one or more servers 222. Image, photo, text, or character recognition operation may be performed to identify at least one of paper documents 212-214 or book 215. Examples of image, photo, text, or character recognition engines are provided by U.S. Patent Publication Nos. 2011-0110594 or 2012-0102552 all herein incorporated by reference as if fully set forth. In addition, identification may be performed by a document mosaicing algorithm performed partially or completely by any one of devices $206_1$, $208_1$, $210_1$, or $224_1$.

Once identified, a digital version or copy of any one of paper documents 212-214 or book 215 may be retrieved by any one of devices $206_1$, $208_1$, $210_1$, or $224_1$. The digital version or copy may be retrieved from memory 106 or storage device 110 in at least one of devices $206_1$, $208_1$, $210_1$, or $224_1$ using network 218 or communication links. The digital version or copy may also be retrieved from one or more servers 222 using communication link 220 over network 218. In addition, the digital version or copy may be retrieved by or from a cloud server configured on one or more servers 222 over communication link 220.

Moreover, any information such as the author, author profile, version, history, timestamps, location tracking information, position tracking, social networking related information, or cloud based information may be retrieved from memory 106 or storage device 110 in any one of devices 206$_1$, 208$_1$, 210$_1$, or 224$_1$. Location tracking information may indicate what offices or desks the at least one of paper documents 212-214 has visited. This same information may also be retrieved from one or more servers 222 over network 218. This information may be used for smart paper tracking, paper analytics, or real-world document management.

Prior to retrieval of a digital version or any information by any one of devices 206$_1$, 208$_1$, 210$_1$, or 224$_1$, a password or any other security verification process may be initiated such that a print-out of confidential information that needs to be secure may still be secure with the digital copy. Security verification may include any biometric, voice, or sensor based check by at least one of sensors 126. Moreover, having a print-out of least one of paper documents 212-214 may indicate to any one of devices 206$_1$, 208$_1$, 210$_1$, or 224$_1$ or servers 222 that the person in possession of the paper documents has permission to retrieve, view, or edit the digital copy. The digital copy may otherwise be protected, locked, or encrypted.

In addition, once identified more printed or reprinted copies of at least one of paper documents 212-214 may also be created of the same or altered versions of the document providing a hybrid workspace environment. Once identified, a timestamp for the time of identification may be stored in any one of devices 206$_1$, 208$_1$, 210$_1$, or 224$_1$ or servers 222.

Once identified, the position of at least one of paper documents 212-214 may be digitally tracked in workspace 202 by any one of devices 206$_1$, 208$_1$, 210$_1$, or 224$_1$ with one or more sensors 206$_2$, 208$_2$, 210$_2$, or 224$_2$. With tracking, at least one of paper documents 212-214 can be moved from different screens and shared, emailed, altered, or the like by any one of devices 206$_1$, 208$_1$, 210$_1$, or 224$_1$. With tracking, at least one of paper documents 212-214 can be located in the real-world on a desk for a certain time period, in an office, a particular building, or in a remote location. Book 215 may be used similarly in this environment across multiple devices depending on digital rights management or copyrights.

Also, once identified, one or more sensors 206$_2$, 208$_2$, 210$_2$, or 224$_2$ may be configured to face or eye track a user using a facial recognition or an eye tracking engine by any one of devices 206$_1$, 208$_1$, 210$_1$, or 224$_1$ to pull up information when at least one of paper documents 212-214 or book 215 is gazed, looked at, or read. Moreover, a timeline and history of at least one of paper documents 212-214 may be displayed on one or more display devices 122 on any one of devices 206$_1$, 208$_1$, 210$_1$, or 224$_1$ in connection with recorded user activity in any given time frame, order, etc. This way, a user's or worker's work habits may be tracked and any one of devices 206$_1$, 208$_1$, 210$_1$, or 224$_1$ may act as digital eyes to see at least one of paper documents 212-214 as a user sees it.

In addition, once at least one of paper documents 212-214 or book 215 is identified, a mental snapshot of content that was being reviewed at a certain time may be determined or retrieved by any one of devices 206$_1$, 208$_1$, 210$_1$, or 224$_1$. The exact position within workspace 202 at a given time of documents related to at least one of paper documents 212-214 may also be provided by any one of devices 206$_1$, 208$_1$, 210$_1$, or 224$_1$ or servers 222. This may provide what digital and real-world documents were being referenced or track citations while working on any one of devices 206$_1$, 208$_1$, 210$_1$, or 224$_1$. It may also provide what information was used in the digital and the real-worlds while working on any one of devices 206$_1$, 208$_1$, 210$_1$, or 224$_1$. Any of these snapshots of past work environments or desktops by any one of devices 206$_1$, 208$_1$, 210$_1$, or 224$_1$ may be stored in storage device 110 or remotely and recreated in the future.

Tracking may also allow determination of when and in what physical folder at least one of paper documents 212-214 is filed in workspace 202. Accordingly, the digital version of at least one of paper documents 212-214 is subsequently filed in the same or similar folder online in any one of devices 206$_1$, 208$_1$, 210$_1$, or 224$_1$ or servers 222.

Once at least one of paper documents 212-214 or book 215 are identified, one or more sensors 206$_2$, 208$_2$, 210$_2$, or 224$_2$ may be configured to detect or track hand, finger, palm, or any other body gestures made on or to at least one of paper documents 212-214. Using components in object device 100, configurations of devices 206$_1$, 208$_1$, 210$_1$, or 224$_1$ may use infrared sensors, infrared cameras, infrared transceivers, cameras, acoustic waves, or ultrasound transducers to detect or track gestures. Tracking or gesture detection engines or systems are given by U.S. Patent Publication Nos. 2010-0201811, 2011-0025827, 2011-0096182, 2011-0188054, 2011-0211044, 2011-0188054, 2012-0050488, U.S. Pat. No. 8,166,421, and PCT Publication No. WO 12/011044 all herein incorporated by reference as if fully set forth.

A tracking engine may determine if a user is reading a part, section, paragraph, sentence, word, or page of at least one of paper documents 212-214 or book 215. Subsequently, any one of devices 206$_1$, 208$_1$, 210$_1$, or 224$_1$ may display information on one or more display devices 122 in real-time relevant to the part, section, paragraph, sentence, word, or page to enhance reading and productivity. This may be done by any one of devices 206$_1$, 208$_1$, 210$_1$, or 224$_1$ using 206$_2$, 208$_2$, 210$_2$, or 224$_2$ based on tracking gestures or finger placement. Moreover, section numbers, paragraph numbers, or page numbers may be detected to quickly determine which section of at least one of paper documents 212-214 is being currently read by a user.

Figure 2A:
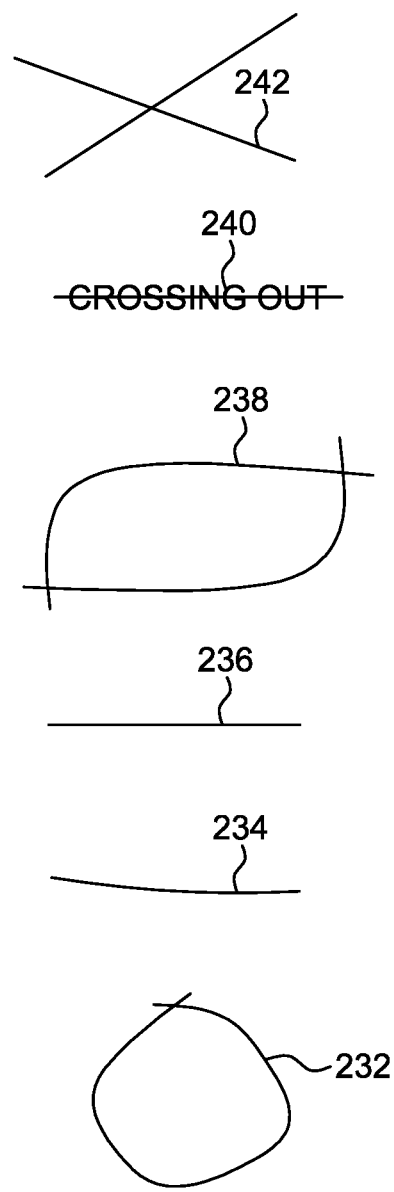
FIG. 2a is a diagram of gestures or inputs.

Moreover, a part, section, paragraph, sentence, or page of at least one of paper documents 212-214 or book 215 may be highlighted or edited by a user using various gestures, hand motions, finger motions, or body motions. FIG. 2a is a diagram of gestures or inputs where a part, section, paragraph, sentence, word, or page of at least one of paper documents 212-214 or book 215 may be highlighted or edited by a circling gesture 232, underlining gesture 234, underlining gesture 236, making a two-handed "L-shaped" box gesture 238, crossing-out gesture 240, or crossing-out gesture 242 detected by one or more sensors 206$_2$, 208$_2$, 210$_2$, or 224$_2$. Any changes made may be soon reflected on a projection screen proximate to workspace 202 with projector device 132. In addition to body gestures, voice or speech commands may be detected by any one of devices 206$_1$, 208$_1$, 210$_1$, or 224$_1$ to be used alone or in combination with gestures. For instance, tracking may be commenced via a voice command.

Around workspace 202, while the user is making edits, manipulating, cleaning up, writing hand-written notes, or writing virtual notes on at least one of paper documents 212-214 or book 215, the digital version retrieved by any one of devices 206$_1$, 208$_1$, 210$_1$, or 224$_1$ may also be updated or digitally corrected in real-time.

In addition, once at least one of paper documents 212-214 or book 215 are identified one or more sensors 126, $206_2$, $208_2$, $210_2$, or $224_2$ may be configured to detect when content is grabbed or selected on at least one of paper documents 212-214 or book 215 and thrown or placed on one or more display devices 122 on any one of devices $206_1$, $208_1$, $210_1$, or $224_1$. The content may be any one of text, paragraphs, sections, characters, images, photos, pages, or the like. For example, information on at least one of paper documents 212-214 or book 215 may be selected to fill in fields of a form displayed on one or more display devices 122 of any one of devices $206_1$, $208_1$, $210_1$, or $224_1$. If the information on at least one of paper documents 212-214 or book 215 is an image of text, it may be converted automatically to text or characters via an optical character recognition engine once placed on one or more display devices 122 on any one of devices $206_1$, $208_1$, $210_1$, or $224_1$. This may be helpful in filling out digital forms from hand-written paper forms or notes.

Moreover, a pinch or grab gesture may be used to select content on at least one of paper documents 212-214 or book 215. After selection, a throw, tossing, or any other gesture motion may be used to digitally place the selected content on one or more display devices 122 on any one of devices $206_1$, $208_1$, $210_1$, or $224_1$.

In addition, after any one of the selection gestures given above, a user's hand, finger, arm, or any other body part may be tracked by one or more sensors 126, $206_2$, $208_2$, $210_2$, or $224_2$ until a touch or multi-touch input or gesture is detected on one or more display devices 122 by touch detectors 124 on any one of devices $206_1$, $208_1$, $210_1$, or $224_1$ to determine where to digitally place, drop, or position the selected content. Once the touch input is detected, any one of devices $206_1$, $208_1$, $210_1$, or $224_1$ retrieves and displays the selected content from the digital version at the drop point or position. The selected content on at least one of paper documents 212-214 or book 215 may be placed on a digital desktop, in an application, in browser, on a photo, or any other digital content on one or more display devices 122 on any one of devices $206_1$, $208_1$, $210_1$, or $224_1$. In addition to touch inputs, any of the input devices or methods described for object device 100 above may be used to determine where to place, drop, or position the selected content on one or more display devices 122 on any one of devices $206_1$, $208_1$, $210_1$, or $224_1$. These features may be used for productivity, data entry, forms, gaming, word processing, spreadsheets, or the like.

While a user's hand, finger, or arm is tracked, ultrasound source/detector 125 may be configured in combination with touch detectors 124, elevation, indenting, or texturizing controller 121, one or more display devices 122, pressure sensors 123, or sensors 126 to project or generate ultrasound waves, rays, or beams to the user's hand, finger, or arm. The ultrasound over air may simulate elevated, indented, or texturized sensations. The ultrasonic sensation may be provided until a touch or multi-touch input is detected on one or more display devices 122 by touch detectors 124 on any one of devices $206_1$, $208_1$, $210_1$, or $224_1$.

In the given examples of office work models, at least one of paper documents 212-214 or book 215 may be the focus instead of devices $206_1$, $208_1$, $210_1$, or $224_1$ creating a smart paper centric environment or paper centric computing environment. Moreover, the online digital world is better linked or hyperlinked with the offline world of paper documents. The linking may be viewed as real-world hyperlinking. The tracking of documents within a workspace, office, or building may create an accounting system for paper documents similar to digital documents. The tracking may also create a recorded lifecycle or timeline for the paper document or paper and digital version of the document. From another viewpoint, an apparatus and process is provided to help to create a smart or interactive paper environment.

Still referring to FIG. 2, part of workspace 202 may include a surface or tabletop computing portion $211_1$ having one or more sensors $211_2$ for detecting or tracking at least one of paper documents 212-214 or book 215. One or more sensors $211_2$ may each be configured as a camera, a field camera, a camera with a 180 degree fisheye lens, an infrared camera, an infrared sensor, an infrared transceiver, a Microsoft Kinect motion sensing device, a Microsoft Kinect motion sensing system, a depth sensor, a laser finder, a stereo vision sensor, or a special paper sensor. Surface or tabletop computing portion $211_1$ may be configured with at least some of the components and parts provided in object device 100.

Surface or tabletop computing portion $211_1$ may provide another angle for collecting information on at least one of paper documents 212-214 or book 215 for identification, recognition, tracking, or providing information. Information captured by surface or tabletop computing portion $211_1$ may be shared directly with device $210_1$ via communication link 232 using one or more network adapters 128 for identification, recognition, or providing information. Communication link 232 may operate using Wi-Fi direct, Digital Living Network Alliance (DLNA), peer-to-peer communication, adhoc networking, or any other device to device communication protocol. Any detected content or information may also be shared with any one of devices $206_1$, $208_1$, $210_1$, or $224_1$ via communication link 230 using one or more network adapters 128 over network 218 to identify or track at least one of paper documents 212-214 or book 215.

Figure 3:
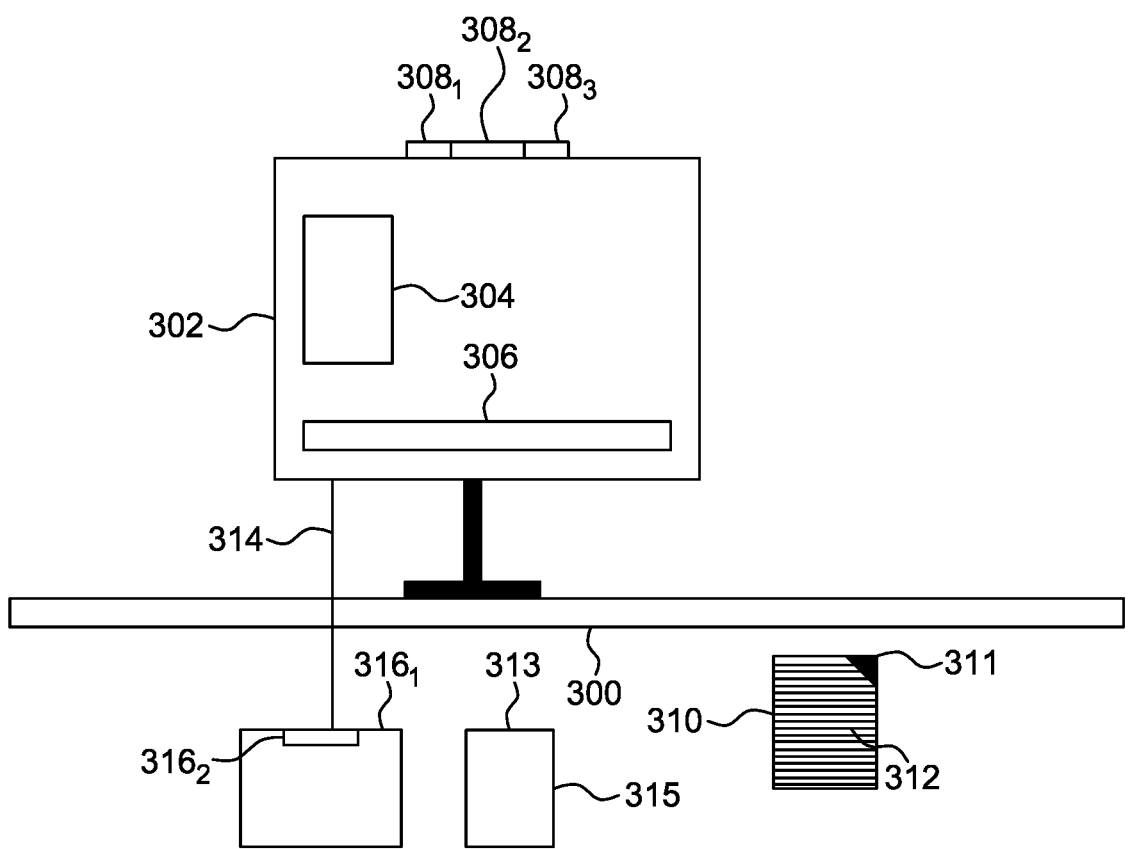
FIG. 3 is another diagram of an apparatus to detect at least one object, book, or paper document using one or more sensors.

FIG. 3 is another diagram of an apparatus to detect at least one object, book, or paper document using one or more sensors. Integrated desktop computing device 302, on surface 300, may be configured with sensors $308_1$-$308_3$. Integrated desktop computing device 302 may be configured with at least some of the components and parts provided in object device 100. Sensors $308_1$-$308_3$ may each be configured as a camera, a field camera, a camera with a 180 degree fisheye lens, an infrared camera, an infrared sensor, an infrared transceiver, a Microsoft Kinect motion sensing device, a Microsoft Kinect motion sensing system, a depth sensor, a laser finder, a stereo vision sensor, or a special paper sensor.

At least one of sensors $308_1$-$308_3$ may be used to detect paper document 310 or book 313 by looking for markers or identifiers on the back portion or side 311 or 315, respectively. Markers or identifiers may also be searched for on front portion or side 312. The detection algorithm or engine may be based on the descriptions provided previously above. Also, in the examples given herewith at least one of sensors $308_1$-$308_3$ may be used in combination with any of sensors 126 for detecting paper document 310 or book 313.

Integrated desktop computing device 302 may identify paper document 310 or book 313 based on the descriptions provided previously above. Once identified, information related to paper document 310 or book 313 may be retrieved over a network from a server or another device (not shown) as previously explained above. With integrated desktop computing device 302, a user may be situated in front and review paper document 310 or book 313 while integrated desktop computing device 302 ubiquitously brings up or displays relevant information 304 and 306.

Device 3161 using one or more sensors 3162 may share information with integrated desktop computing device 302 over communication link 314 using one or more network adapters 128 to provide information, detect, recognize, or identify paper document 310 or book 313. Communication link 314 may also be used to share information once paper document 310 or book 313 is identified. Communication link 314 may operate using Wi-Fi direct, Digital Living Network Alliance (DLNA), peer-to-peer communication, adhoc networking, or any other device to device communication protocol.

Figure 4:
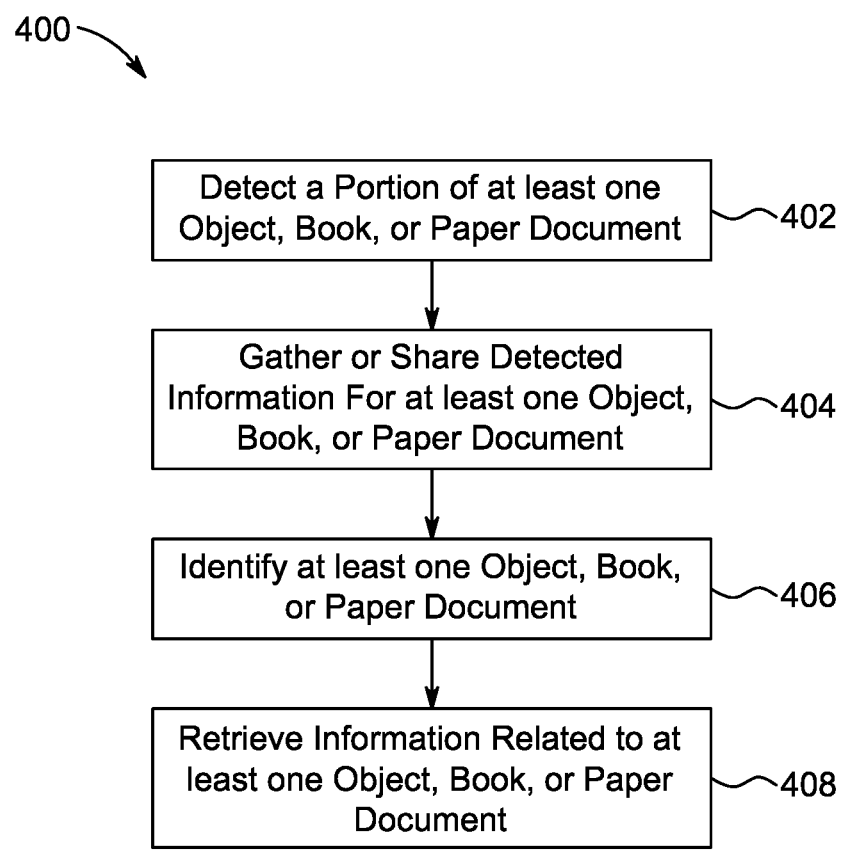
FIG. 4 is a process for identifying at least one object, book, or paper document.

FIG. 4 is a process 400 for identifying at least one object, book, or paper document in connection with some of the descriptions given above. A portion or segment of the at least one object, book, or paper document is detected or captured by a device or multiple devices using sensors, such as a camera, infrared sensor, or a Microsoft Kinect like sensor system (402). The device or multiple devices may be computing devices or any of the devices previously provided in the descriptions above. Detected information is gathered or shared for the at least one object, book, or paper document between detection devices (404). The at least one object, book, or paper document is identified by one or more detection devices in connection with the gathered or shared information (406). Information related to the at least one object, book, or paper document is retrieved or shared by one or more devices (408).

Figure 5:
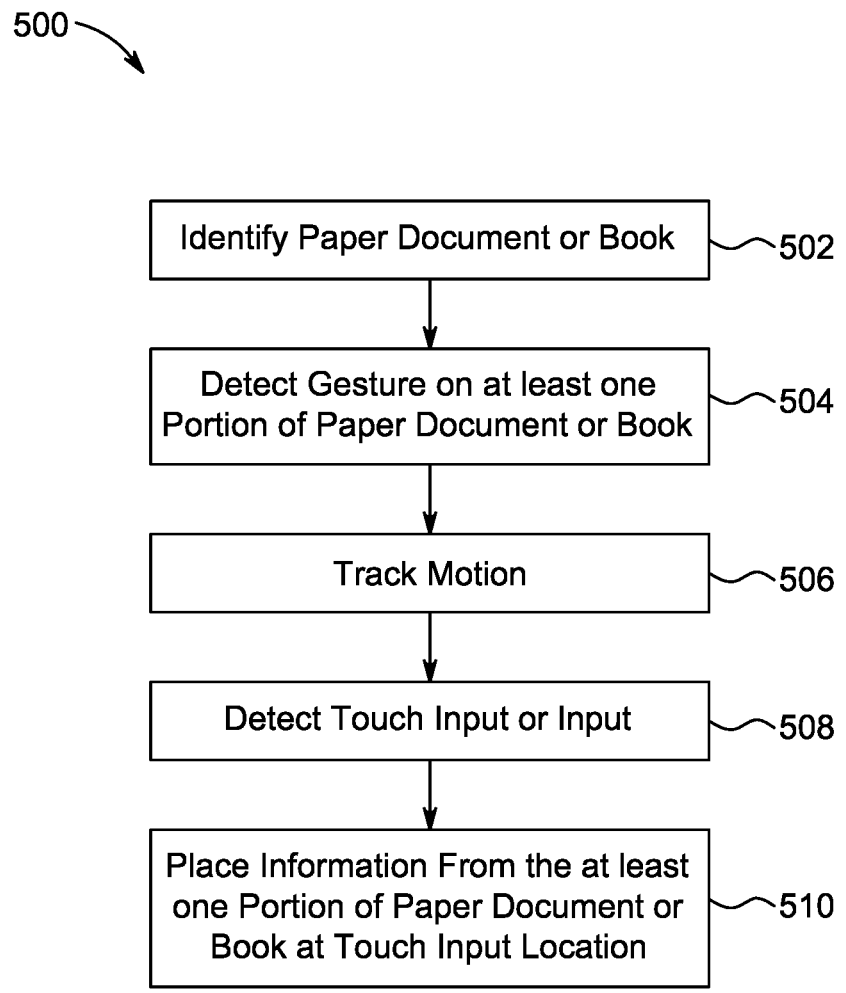
FIG. 5 is an interactive process related to a book or paper document.

FIG. 5 is an interactive process 500 related to a book or paper document in connection with some of the descriptions given above. A paper document or book is identified by at least one device based on one of the processes provided in the description above (502). A gesture is detected by the at least one device, as explained above, on at least one portion of the paper document or book using one or more sensors (504). The body part motion is subsequently tracked by one or more sensors (506). A touch input or input on a display device of the at least one device is detected (508). Information from the at least one portion of the paper document or book at the touch input location is digitally retrieved and placed or displayed on the display of the device (510).

Although features and elements are described above in particular combinations, each feature or element may be used alone without the other features and elements or in various combinations with or without other features and elements. The methods, processes, or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, digital versatile disks (DVDs), and BluRay discs.

Suitable processors include, by way of example, a general purpose processor, a multicore processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement hardware functions for use in a computer, or any host computer. The programmed hardware functions may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

Any of the displays, processors, memories, devices or any other component disclosed may be configured, produced, or engineered using nanotechology based nanoparticles or nanodevices.

What is claimed is:

1. A mobile electronic device comprising:
   at least two rear facing cameras configured to capture a part of an environment and to capture a part of a paper document in the environment;
   a camera and a depth sensor configured to capture biometric facial information for security verification;
   a processor configured to identify characteristics of the environment based on the captured part of the environment, the captured part of the paper document, and information received via a network adapter, wherein the identification is performed subsequent to a successful result of the security verification;
   the process configured to detect, based on the at least two rear facing cameras, a user gesture on the paper document, wherein the user gesture is a command to digitally edit or highlight a portion of the paper document; and
   the processor configured to retrieve additional information of the identified characteristics of the environment.

2. The mobile electronic device of claim 1 further comprising:
   the processor is configured to utilize assistance information for the identification; and
   wherein the assistance information is obtained, by the mobile electronic device, from the captured part of the environment.

3. The mobile electronic device of claim 1, wherein eye tracking is utilized to track position or location of the mobile electronic device.

4. The mobile electronic device of claim 1, wherein a timeline or history of the identified characteristics of the environment is retrieved.

5. A method performed by a mobile electronic device, the method comprising:
   capturing, by at least two rear facing cameras of the mobile electronic device, a part of an environment and a part of a paper document in the environment;
   capturing, by a camera and a depth sensor of the mobile electronic device, biometric facial information for security verification;
   identifying, by a processor of the mobile electronic device, characteristics of the environment based on the captured part of the environment, the captured part of the paper document, and information received via a network adapter, wherein the identification is performed subsequent to a successful result of the security verification;
   detecting, based on the at least two rear facing cameras by the processor a user gesture on the paper document, wherein the user gesture is a command to digitally edit or highlight a portion of the paper document; and retrieving additional information of the identified characteristics of the environment.

6. The method of claim 5 further comprising:
utilizing, by the processor, assistance information for the identification; and
obtaining, by the mobile electronic device, the assistance information from the captured part of the environment.

7. The method of claim 5, wherein eye tracking is utilized to track position or location of the mobile electronic device.

8. The method of claim 5, wherein a timeline or history of the identified characteristics of the environment is retrieved.

* * * * *